June 29, 1954 G. K. GRAHAM 2,682,572

PHOTOGRAPHIC RECORDING OF TELEVISION PROGRAMS

Filed June 1, 1951 3 Sheets-Sheet 1

INVENTOR
George K. Graham
BY
ATTORNEY

June 29, 1954 G. K. GRAHAM 2,682,572

PHOTOGRAPHIC RECORDING OF TELEVISION PROGRAMS

Filed June 1, 1951 3 Sheets-Sheet 2

INVENTOR
George K. Graham
BY
Ollie ... Mitchell
ATTORNEY

June 29, 1954 G. K. GRAHAM 2,682,572

PHOTOGRAPHIC RECORDING OF TELEVISION PROGRAMS

Filed June 1, 1951 3 Sheets-Sheet 3

INVENTOR
George K. Graham
BY
John J. Mitchell
ATTORNEY

Patented June 29, 1954 2,682,572

UNITED STATES PATENT OFFICE 2,682,572

PHOTOGRAPHIC RECORDING OF TELEVISION PROGRAMS

George K. Graham, Oceanside, N. Y., assignor to Radio Corporation of America, a corporation of Delaware Application June 1, 1951, Serial No. 229,487

8 Claims. (Cl. 178—5.8)

This invention relates to a system for making a photographic record of a television program. In particular, it relates to a type of system wherein the photographic recording is made directly from the scene to be televised.

In operating a television station, it is often necessary to obtain a photographic recording of a program in order that reprints may be made and distributed to other stations which cannot for one reason or another carry the live program. The most widely used method of making photographic recordings of a television program is known as kinescope recording wherein the photographic camera actually takes a picture of the images reproduced on a monitoring kinescope. When the recordings made in this way are used for transmission purposes, however, the quality of the images reproduced on television receivers indicates possible grounds for improvement at the present state of the art. However, no noticeable degradation of the image is present when films are used which are direct recordings of the program. Therefore, better rendering may be made if a photographic camera is mounted beside a television pickup tube in each of the studio cameras so that they can make direct recordings of the scenes as they appear at the pickup tube.

The broad idea of combining a photographic camera and a television pickup tube to form a studio camera has heretofore been suggested. When several studio cameras of the type noted above are used, the television pickup tubes may run continuously and the output signals are applied to the transmitter by suitable switches. Thus a change from one pickup tube to another can be brought about instantaneously. However, in order to conserve film, the photographic cameras must operate only when the corresponding pickup tube is connected to the transmitter.

Because the strip of film in each photographic camera may thus be exposed to non-successive sequences or shots, it is necessary in the photographic processing room to cut the various strips of film and splice the various sequences or shots together in their proper order.

It is the customary practice today to record the sound portion of a television program separately from the photographic portion. Therefore, the film on which the sound recording is made must also be synchronized with each of the photographic recordings. In fact this synchronization must be exact in order that the sounds produced may coincide with the motion of the objects producing them. For example, if a steam whistle is blown the whistle should occur at the same time the steam appears.

In making the sound recording, a plurality of microphones may be employed, any number being connected to the sound recorder at any given time. Thus, a single sound recording film may be produced. As this film generally runs continuously, it is apparent that during switching intervals from one studio camera to another that the sound film continues to run whereas the photographic recording is momentarily interrupted. Such discrepancies are not of much importance in and of themselves, but their accumulated effect may be quite serious at the end of a half-hour program where many switches are made from one studio camera to another. For this reason it is necessary that indicia be marked on the sound recording film, or other synchronous recording media, so that the sound strip can be readily and properly aligned with the photographic recording.

It is therefore an object of this invention to provide improved means whereby the film in each strip may have printed thereon identifying information that will make the splicing process easier.

According to this invention an arrangement is provided wherein a plurality of television cameras and associated motion picture cameras are synchronized to provide titling on the film in order that television sequences may be easily recognized on the film strip. The arrangement provides for delay in shifting from the one camera to the next to allow the film camera drive motor to come up to speed. Film cameras are timed to overlap and the switching of television cameras is delayed slightly. The frame at which the actual switching takes place is indicated by a horizontal line spaced between frames. The lateral position of this line may indicate the camera in which the film is operating.

The manner in which the above objective will be achieved in accordance with the principles of this invention become more readily apparent from a consideration of the drawings, in which.

Figure 1:
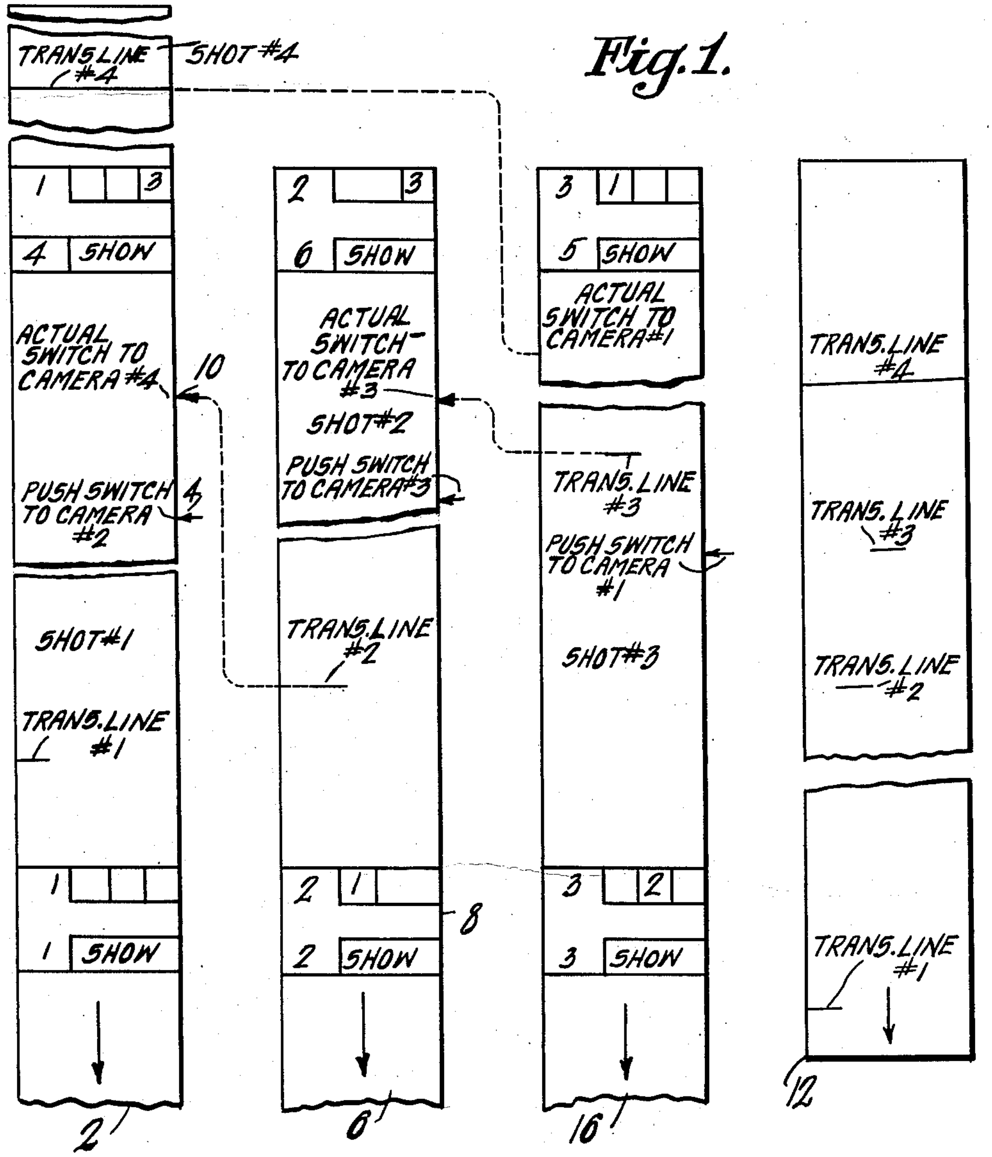
Figure 1 illustrates some samples of photographic and acoustic recording film that are to be produced in accordance with the principles of this invention.

Turning now in more detail to the drawings, Figure 1 shows three strips of film as they would appear in three different studio cameras as well as a sound film that would be produced if the principles of this invention are employed. The arrows at the bottom edges of the various strips of film indicate that the film is moving downward. Therefore, as time goes on, the recordings, both photographic and acoustic, move up to the top of each strip.

Let us first assume that all the television cameras are energized and providing video signals and that the motors driving the photographic cameras are not energized. Then, let us assume that a switch is depressed which energizes the driving motor of the photographic camera in studio camera I. The first thing that happens is that indicating lights are turned on so as to title within the area of a single frame, information as to the show, the camera in which the strip of film is running, the previous shot number and the camera taking the previous shot.

One arrangement for such information within a frame area is indicated generally at the lower end of the film strip 2. The indicating lights may be arranged so as to operate instantaneously and therefore title the information noted above onto the film before the photographic camera gets up to speed.

When the camera has gotten up to speed and at an instant when the film in the film gate of the camera is standing still, another light is instantaneously flashed on so as to expose the film strip at a point indicated by a transition line 1 (TL No. 1). This transition line appears at the left hand edge of the film so as to indicate that the film was in studio camera I. At this instant also, the video signals derived by the accompanying television camera are connected to the video output bus.

As long as the camera I remains in continuous operation, shot No. 1 is recorded. At a point indicated by the numeral 4, let us assume that the operator wishes to switch to studio camera II and pushes a selector button for effecting this change. Before the film strip 6 can get up to normal speed, the information as to previous camera, present camera shot number, and show title is fogged onto a frame as indicated by the numeral 8. When, however, camera II gets up to speed and the actual switch is made between its accompanying television camera and the video output bus, a light flashes so as to mark the film strip 6 with a transition line No. 2 (TL No. 2). This transition line is further toward the right than the transition line No. 1 thus indicating that the film was in studio camera II. It is important to note that while the camera II is coming up to speed, the camera I continues to operate and the arrow 10 indicates the point at which the actual switch to camera II took place. In point of time, the point for film strip 2 opposite the arrow 10 is the same as that of transition line No. 2 in the film strip 6.

It is not necessary to actually mark the point on the film strip 2 as its proper position may be found by comparing the film strip 2 with acoustic recording strip 12. Apparatus is provided for marking the transition line No. 1 on the acoustic recording strip 12 and, therefore, this line can be matched up with the transition line No. 1 on the photographic recording strip 2 and the distance between the transition line No. 1 on the acoustic recording strip 12 and the transition line No. 2 on this strip is the same as the distance between the transition line No. 1 on the photographic recording strip 2 and the point 10 indicating the end of the shot No. 1. This matching operation is normally done when the sound strip is spliced to the picture film. The operator in the splicing room then cuts off the film strip 2 at a point opposite the T. L. No. 2 on the acoustic film. The dotted lines going from photographic film strip 2 to the film strip 6 and from the film strip 6 to another photographic film strip 16 and from the photographic film strip 16 back to the photographic film strip 2 indicate a possible sequence of operation, in which the cameras 1, 2, 3 and 1 are successively operated in the order indicated.

Figures 2, 2A:
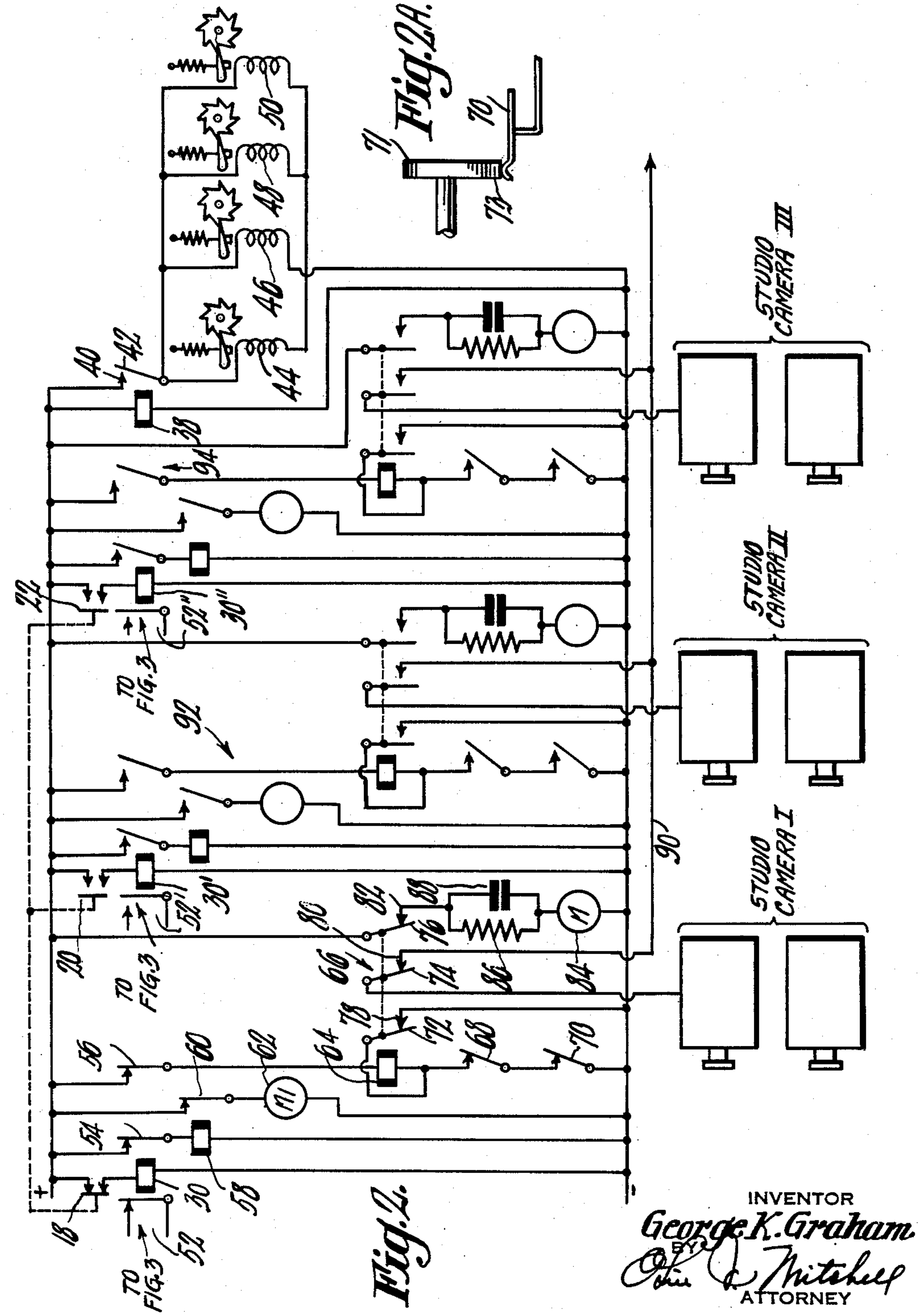
Figure 2 illustrates the apparatus for switching from one studio camera to another and for energizing a light at the instant when the video signals from a particular television pickup tube are applied to a video output bus.
Figure 2A illustrates the apparatus for energizing the transition lights only when the film is stationary.

Figure 2 illustrates a portion of the details of mechanism for marking film in the manner indicated in Figure 1. Selector buttons 18, 20 and 22 for selecting studio cameras 24, 26 and 28 respectively are mechanically interlinked as indicated by the dashed lines. In a manner well known to those skilled in the art, the mechanical linkage may be such as to close one selector button to its accompanying contact and to remove the other two selector buttons from their accompanying contacts just before the depressed selector button makes contact. Hence there is a time when none of the selector buttons make contact.

The selector buttons 18, 20 and 22 complete circuits between the positive terminal of a source of fixed potential and a negative terminal of this source through relay actuating coils 30, 30' and 30'' respectively.

The following details relate to the manner in which information for the present shot number is obtained. A relay actuating coil 38 is also connected between the positive and negative terminals of the fixed source of potential and is therefore in parallel with the relay coils 30, 30' and 30''. A contact 40 of a switch that is operated by the relay coil 38 is connected to the positive side of the source of fixed potential and the other contact 42 of this switch is connected through a plurality of parallel actuating coils 44, 46, 48, and 50 to the negative terminal of the source of fixed potential. Each of the actuating coils 44, 46, 48, and 50 are located at one end of an arm of any well known type counter mechanism. The arms are urged upwardly by springs, as shown. During the instant when no pushbutton makes electrical contact, the amount of current flowing through the relay coil 38 is a maximum and is sufficient to close the contacts 40 and 42. This energizes all of the actuating relays 44, 46, 48, and 50 and advances the counter mechanism associated therewith by one notch. A moment later, however, one of the selector buttons 18, 20, or 22 touches its associated contact causing one of the relay coils 30, 30' or 30'' to be in parallel with the relay coil 38, and to shunt away some of the current that momentarily flowed in it. This relay is so arranged that this loss of current permits the contacts 40 and 42 to again separate from one another and the springs are free to pull the levers of the counter mechanisms back to the original position. Upon the pressing of another button, the process is repeated so that the counters are all advanced one notch each time one of the buttons 18, 20, and 22 is depressed. The manner in which the number on the counter is fogged on the film will be explained hereinafter.

The following details relate to the manner in which the transition lines of Figure 1 are recorded. If, for example, the selector button 18, that is associated with studio camera I, is depressed the relay coil 30 is energized and causes the normally open contacts 52, 54, and 56 to close. The circuitry connected with the contact 52 will be explained in connection with Figure 3.

Upon the closing of the contact 54, the coil 58 of a motor starting relay is connected between the positive and negative terminals of the source of fixed potential. This in turn closes a contact 60 so as to energize a motor 62 that drives the film camera in the studio camera I. The motor 62 then proceeds to come up to speed.

Upon the closing of the contact 56, a relay coil 64 that operates the relay generally indicated by the numeral 66 is connected to the positive side of the source of fixed potential. The opposite side of the relay coil 64, is connected through two contacts 68 and 70 to the negative side of the source of fixed potential. The contact 68 is a centrifugal switch mounted upon the motor 62 and is so adjusted that when the motor 62 comes up to proper speed for recording, the contact 68 is closed. The normally open relay 66 would then close except for the open contact 70. This relay is closed when the film in the film gate of the photographic camera in the studio camera 24 is stationary by the action of a cam 71 that is coupled so as to make a fixed relation to the Geneva movement customarily employed in cameras to pass the film through the film gate in intermittent fashion. The projection 73 is placed on the periphery of the cam 71 so as to close the switch 70 when the film is stationary. Therefore, when the switch 66 associated with the relay coil 64 closes, the motor 62 driving the photographic camera is up to speed and the film is stationary in the gate.

Figure 4:
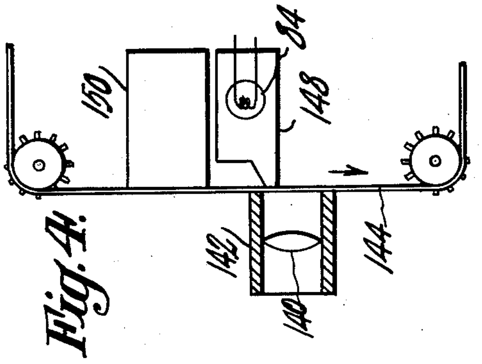
Figure 4 illustrates the manner in which the various indicating devices may be incorporated into a motion picture camera so as to place the cuing signals on the film therein.
Figure 4A:
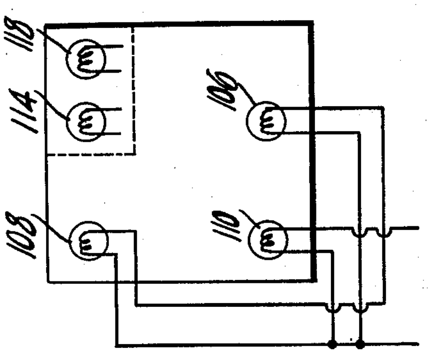
Figure 4A illustrates in greater detail a different view of the indicating devices including the camera of Figure 4 so as to show one manner in which the different lights may be focused.

The switch 66 in this particular case has three ganged arms 72, 74, and 76 that are arranged opposite corresponding contact points 78, 80, and 82. A light 84 is connected in series with a parallel resistor 86 and condenser 88 from the negative side of the fixed source to its contact 78. Therefore, when the arm 72 of the switch 66 touches the contact 78, the light 84 is momentarily energized. As soon as the condenser 88 becomes charged to the fixed potential, current will cease to flow in such quantity as to illuminate the light 84 due to the size of the resistor 86. The function of the resistor 86 is to discharge the condenser 88, so that when the selector button 18 is again pressed and the switch 66 closed, the light 84 can again be momentarily energized. It is this light 84, as indicated in Figures 4 and 4A that fogs the film strip No. 2 of Figure 1, with transition lines.

The operation of the switch 66 also connects the television pickup tube of studio camera I to the output video bus via contacts 74 and 80. The closing of the contacts 76 and 82 provides a holding circuit for energizing the relay coil 64 when the switch 70 is open. This switch is only momentarily closed at a time when the film is stationary in the gate.

The studio cameras II and III are controlled by the switching networks generally indicated by the numerals 92 and 94. Details of switch 70 are shown in Figure 2A. Contact 70 closes only when the film strip is stationary in the gate 116 of Figure 4. This is accomplished by employing a cam 73 driven by the film driving motor 62. In view of the fact that these networks are identical with the one just explained, corresponding parts are indicated by numerals primed in the case of the relay network 92 and by double primes in the case of the relay network 94. As many such networks can be employed as desired.

Figure 3:
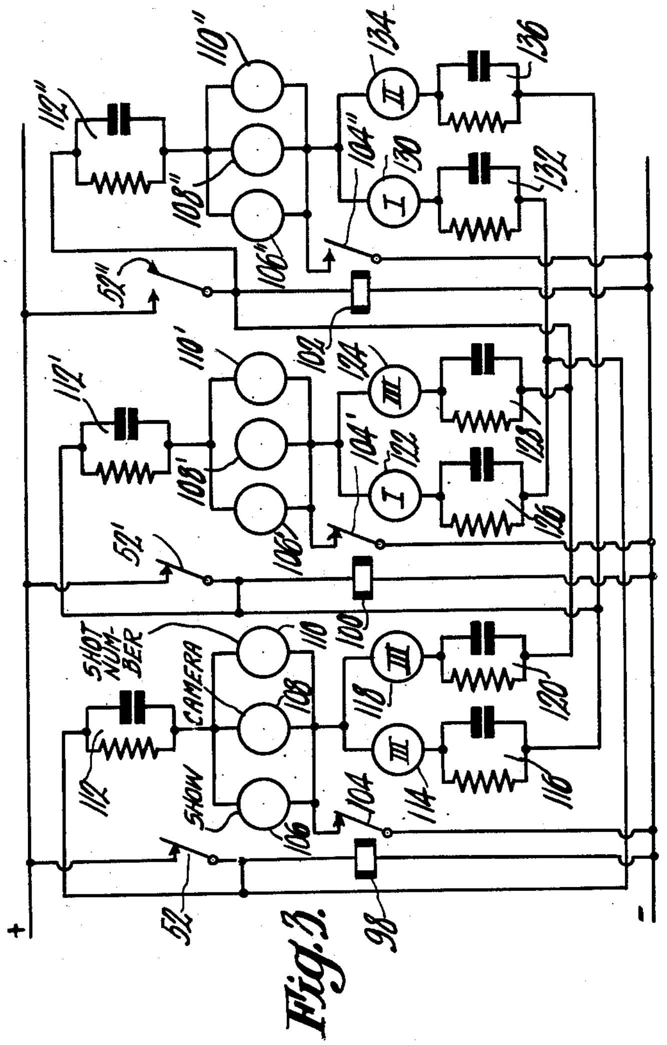
Figure 3 illustrates in more detail a switching system adapted to provide indications as to the camera taking the previous sequence, the number of the present sequence, the camera taking the present sequence, and the show title.

Figure 3 illustrates the details of the manner in which the information as to show, title, present camera number, previous camera number, and shot sequence number are fogged onto a film in each of the photographic cameras. The switches 52, 52′ and 52″ indicated in Figure 2 are shown in Figure 3 with their accompanying circuitry. The switches 52, 52′ and 52″ are connected in series with relay actuating coils 98, 100, and 102 respectively between the positive and negative terminals of a source of fixed potential. When the selector button 18, as shown in Figure 2, is depressed so as to energize the relay coil 30, the contact 52 is closed and the relay actuating coil 98 is energized. This in turn closes a switch 104. One contact of the switch 104 is connected to the negative terminal of the source of fixed potential, and the other contact of the switch 104 is connected to a parallel bank of indicator lights 106, 108, and 110, that are arranged to illuminate the show title, the camera number and the shot number respectively. A parallel resistor and condenser combination 112 is connected in series with the switch 104 and the bank of indicator lights to a point between the switch 52 and its associated actuating coil 98. Due to the charging and discharging action of the condenser 112, the indicator lights are momentarily energized at the instant the switch 104 closes so that even if the film is moving the images fogged on the film are not blurred. The resistance that is thus momentarily placed in parallel with the relay coil 98 is too large to bypass enough current around that coil to permit the switch 104 to drop out of contact.

The time consumed between the closing of the selector button 18 and the closing of the switch 104 is arranged in a manner well known to those skilled in the art to be longer than the time required for the counters of Figure 2 to advance one notch so as to indicate the new shot number. Thus, when the parallel bank of lights including the shot sequence number light 106 is energized, as described immediately above, the counter mechanisms have come to rest and the shot number is not blurred on the film. The corresponding parts in the cameras II and III are indicated by numerals primed and double primed respectively.

The indicator lights as to the previous camera are operated as follows. Assuming that there are three studio cameras I, II, and III, each of them will have at least two indicator lights adapted to fog the numbers of the other cameras onto the film. Obviously, in a three-camera system, there can be only two possible previous cameras. In this particular arrangement then, an indicating light 114 adapted to illuminate the numeral I is connected between a point on the positive side of the switch 104 which may be the junction between the switch and the parallel bank of indicator lights 106, 108, and 110, and a point intermediate the switch 52′ and the relay actuating coil 100 that are associated with the studio camera II. If the switches 52, 52′, and 52″ are quick to close and slow to release, and assuming that camera II was the camera taking the previous sequence, the closure of switch 52 in the camera I will occur when the switch 52′ in the camera 26 is still closed. Accordingly, a path may be traced from the negative side of the fixed potential through the switch 104, the indicator light 114, that illuminates the numeral I, a parallel resistor condenser combination 116 and the switch 52′ to the positive side of the source of fixed potential. The indicator light 114 that illuminates the numeral II is only momentarily energized due to the action of the parallel resistor condenser combination 116.

If the studio camera III took the previous shot, the switch 52′ associated with the camera II would be open and therefore the indicator light 114 would not be energized. However, a path may be traced between the negative side of the fixed potential through the switch 104 and indicator light 118 that is adapted to illuminate a numeral III and a condenser resistor combination 120 to a junction between the switch 52″ and the relay actuating coil 102, that are associated with the camera 28 through the switch 52″ to the positive side of the source of fixed potential. Thus, when the camera III took the previous shot, only the indicator light 118 was energized.

The camera II is provided with two indicator lights 122 and 124, the former being adapted to illuminate a numeral I and the latter being adapted to illuminate a numeral III. The indicator light 122 is connected in series with a parallel resistor condenser combination 126 between the upper side of a switch 104′ and the junction between the switch 52 and the relay actuating coil 98 of the camera I. The indicating light 124 is connected in series with a parallel resistor condenser combination 128 between the upper side of the switch 104′ and the junction between the switch 52″ and the relay actuating coil 102 of the camera III.

The camera III is provided with an indicator light 130 adapted to illuminate a numeral I. The light 130 is connected in series with a parallel resistor condenser combination 132 between the upper side of the switch 104″ and the intermediate point between the relay 52 and the actuating coil 98 in the camera I. An indicator light 134 adapted to illuminate a numeral II is connected in series with a parallel resistor combination 136 between the upper side of the switch 104″ and the intermediate point between the switch 52′ and the relay actuating coil 100 that are in the camera 26. Thus, each camera is provided with two switches one of which is fast closing and slow releasing, the second switch having one contact connected to a negative source of fixed potential and the other contact coupled to a positive source of fixed potential. An appropriate indicator light is connected in series with the first switch of a camera corresponding to the numeral illuminated by the indicator light.

Figure 4 illustrates one way in which the information may be fogged onto the film of a camera. In customary fashion, a lens system 140 is mounted within a lens barrel 142 that is attached to a camera wall 144, opposite an opening 146 known as the film gate. Any standard mechanism may be employed for intermittently pulling the film through the gate 146. Near one edge of the film gate 146, there is mounted a light shield 148 that has a slit transverse to the motion of the film at the end adjacent the film gate. Inside the light shield 148 is mounted the light 84 of Figure 2. Thus, when this light is momentarily actuated, it fogs a transition line, as indicated in the film strips of Figure 1 onto the film. The lateral position of the transition line is shifted depending on the camera by the lateral position of the slit in the light shield 148. It will be remembered that the switch 70 of Figure 2 only closed when the film was stationary in the gate, and therefore the transition line is a sharp line. The bank of indicator lights 106, 108, and 110 associated with each of the cameras as well as the lines indicating the camera taking the previous shot may be mounted in a light proof box 150. Of course, the particular arrangement of these lights within the box 150 is of no importance, but a simple arrangement is indicated in Figure 4A.

If Figure 4A represents the arrangement of camera 24, for example, the indicator lights for the previous camera are 114 and 118 that are adapted to illuminate numerals 26 and 28 respectively. The other lights 106 for show title, 108 for present camera, and 110 for shot number are arranged as shown in 4A and are connected parallel as indicated in Figure 3. The counters of Figure 2 that are illuminated by the shot number light 110 can be made of Lucite with etched numerals. The light 110 can be mounted one side so as to provide side illumination that is picked up by the etched numerals. The area on the surface on the counter surrounding each etched numeral may, of course, be blacked out with opaque material. Similarly, the show title and the camera number may be etched on Lucite or some similar material and provided with side illumination by the lights 106 and 108 respectively. The previous camera numbers that are illuminated by the lights 114 and 118 in the arrangement of Figure 4A may be etched on the one end of Lucite rods and the other end may be positioned opposite the lights 114 and 118. For that matter, any mask with the proper numerals cut in it can be inserted between the lights 114 and 118 and the film.

What is claimed is:

1. A studio camera comprising in combination a motion picture camera adapted to make a photographic record on a strip of film and a television camera adapted to produce video signals, a video signal output terminal, switching apparatus adapted to apply the video signal derived by said television camera to said output terminal, a light positioned so as to fog a portion of film passing through said motion picture camera, a parallel circuit including condenser and resistor connected in series with said light, a source of fixed potential, said switch also being adapted to connect said source of fixed potential in series with said light and said parallel resistor and condenser circuit at the instant the video signals are applied to said video output terminal.

2. A studio camera as described in claim 1 wherein said motion picture camera is provided with a film gate and means for intermittently moving a strip of film through said gate and wherein light shields are positioned around said light so as to direct light emitted thereby to form a horizontal line just within said gate and transverse to the direction of motion of said film.

3. A studio camera as described in claim 1 wherein means are provided for closing said switch only when said film is stationary.

4. In a system of studio cameras wherein indication is to be recorded as to the studio camera operated during a previous shot and wherein each camera is provided with a first switch and relay actuating coil connected in series between positive and negative terminals of a source of fixed potential, said switch being adapted to close quickly and open slowly, an indicating apparatus comprising in combination a switch adapted to close in response to current in a corresponding relay coil, one side of said latter switch being connected to the negative terminal of said source of fixed potential, an indicating light connected in series with the other side of said latter switch and the junction between said first switch and said relay actuating coil, a parallel combination of a resistor and condenser, a light connected in series with said parallel combination, said latter series combination being adapted to being connected to the side of said latter switch opposite the negative side and the junction between another one of said first switches and relay actuating coils.

5. In a system having a plurality of studio cameras each having a photographic camera that is normally not recording but includes a driving motor and a television camera that is in constant operation, apparatus for initiating the switching of a video signal output bus from one television camera to another in such manner that the photographic camera associated with the television camera to the output of which the video bus is to be switched is permitted to reach its normal operating speed before actual coupling is effected between the output of the corresponding television camera and the video bus comprising in combination a source of potential having positive and negative terminals, a studio camera selection switch for each of the studio cameras, mechanical connections between said switches of such nature that the closing of one selection switch opens all the others, a first relay coil connected in series with each of said selection switches, each of said series combinations being connected between the terminals of said source of potential, switching means for initiating the operation of a photographic camera drive motor in response to the closing of each studio camera selection switch, a second set of relay coils, switching means for connecting one end of each said second relay coil to one of said terminals in response to the closing of the corresponding one of said studio camera selection switches, a centrifugal switch coupled to each of said photographic camera motors, each of said centrifugal switches being adapted to close when the corresponding photographic camera drive motor attains normal speed, a film motion switch connected in series with each of said centrifugal switches, one end of said series combination being connected to the other of said terminals and the other end being connected to the other end of the second relay coil, means for momentarily closing each said film motion switch when the film in its associated camera is stationary, a relay holding switch connected between the junction of the series combination of the centrifugal switch and the film motion switch and said second terminal, and a video switch, said video switch being adapted, when closed, to apply the output of the corresponding television camera to the video output bus, said video switch being adapted to close in response to the energization of said second relay coil.

6. Apparatus as set forth in claim 5 wherein there is provided a series combination of a transition line indicating light, a light energization switch and a resistor and condenser connected in parallel, said last named series combination being connected between the terminals of said source of potential, said light energization switch being adapted to be closed in response to the energization of said second relay coil.

7. Apparatus as set forth in claim 5 wherein the mechanism interlocking said studio camera selection switches is such that during the operation of closing one switch and opening the other there is a moment when none of the studio camera switches is closed, a counter actuating relay having a coil connected between the terminals of said source of potential, a mechanical counter mechanism, means for advancing the counter when said counter actuating relay is closed, the minimum current required to close said counter actuating relay being greater than the current flowing through the relay when the studio camera selection switch finally makes electrical contact.

8. Apparatus as set forth in claim 7 wherein means are provided for momentarily producing a light image of the reading on said counter on the film in the photographic cameras.

References Cited in the file of this patent

UNITED STATES PATENTS

| Number | Name | Date |
|---|---|---|
| 1,810,002 | Arnold | June 16, 1931 |
| 1,950,091 | Owens | Mar. 6, 1934 |
| 2,044,333 | Schmidt | June 16, 1936 |
| 2,052,792 | Owens | Sept. 1, 1936 |
| 2,365,567 | Langer | Dec. 19, 1944 |
| 2,420,197 | Rosenthal | May 6, 1947 |
| 2,538,910 | Miller | Jan. 23, 1951 |
| 2,585,034 | Purington | Feb. 12, 1952 |
| 2,615,088 | Gordon | Oct. 12, 1952 |

FOREIGN PATENTS

| Number | Country | Date |
|---|---|---|
| 377,944 | Great Britain | Jan. 28, 1931 |